ated Oct. 31, 1972

3,701,745
PROCESS FOR PREPARING A COATING COMPOSITION OF COPOLYMERIC VINYLIDENE CHLORIDE
Paul Herman Settlage, Richmond, Va., and Roger Lea Thornton, Wilmington, Del., assignors to E. I. du Pont de Nemours and Company, Wilmington, Del.
No Drawing. Continuation of abandoned application Ser. No. 747,445, July 25, 1968. This application Dec. 23, 1970, Ser. No. 101,169
Int. Cl. C08f 45/52, 45/24
U.S. Cl. 260—28.5 R          2 Claims

ABSTRACT OF THE DISCLOSURE

A coating composition comprising a copolymer of vinylidene chloride is provided wherein the copolymer is of between about 60 parts and about 95 parts by weight of vinylidene chloride and includes a non-ionic surfactant especially adapted for coating film structures of organic thermoplastic polymeric material. A process for preparing said compositions characterized by continuous addition of monomeric materials into a polymerization solution containing a reduction-oxidation initiator and a non-ionic surfactant also is provided.

---

This application is a continuation of application Ser. No. 747,445, filed July 25, 1968 and now abandoned.

THE INVENTION

The present invention relates to coating compositions, process of preparation thereof and an article of manufacture prepared therewith. More particularly, the present invention is directed to improvements in and relating to a coating composition of polymerized vinylidene chloride and to laminar structures comprising a base film coated therewith.

Coating compositions of vinyl polymers and copolymers useful, for example, for coating base film structures such as transparent regenerated cellulose, are well known. To illustrate, U.S. Pat. 2,570,478 describes the coating of flexible and transparent regenerated cellulose film structures with copolymer compositions of vinylidene chloride, acrylonitrile and itaconic acid. Such laminar or coated film structures are desirable for use as packaging materials because characterized by a unique combination of physical properties such as heat, sealability, good barrier performance in respect to protection against permeation of water vapor or undesired gases as well as resistance of the structure to permeation of greases and the like. The above-mentioned coating compositions are characterized by vinylidene chloride copolymer aqueous dispersions with ionic surfactants. As indicated, these dispersions are quite satisfactory for many purposes, but they tend to fail when used as coatings in moist atmospheres. Specifically, the main drawback of such laminar or coated film structures resides in the lack of adhesion of the coating composition to the base film structure, especially wherein the film structure is to be used under conditions of high relative humidity or where the resulting film structure is to be used as a wrapping for articles such as, for example, candy having a high moisture content. As pointed out in the aforementioned patent, prior efforts to adhere polymeric coatings of vinylidene chloride to base film structures such as regenerated cellulose have included the application first of an anchoring sub-coating to the base film structures followed directly by applying the vinylidene chloride polymeric coating to the anchoring subcoating. Other efforts have included incorporating a reactive water soluble resin into the base film structure during its manufacture. For example, resins such as the cationic urea-formaldehyde or melamine-formaldehyde resins have been incorporated in the base film structure at the softener bath stage in the manufacture of the regenerated cellulose base sheet. The latter is largely undesirable because it is difficult to control the concentration of the resin that is incorporated into the regenerated cellulose base film, and furthermore, the resin on the surface of the gel film tends to adhere to the surface of the drying rolls during the drying operation leading to non-uniform drying of the base sheet. Thus, the results of prior efforts to adhere polymerized vinyl chloride coating compositions to base film structures such as those of regenerated gel cellulose have not proven entirely satisfactory. Additionally, the preparation of aqueous vinylidene chloride polymer dispersions in the absence of a surfactant results in dispersions which tend to be unstable; even the best of such dispersions have short-comings with respect to their resistance to moist atmospheres. It is, therefore, the principal object of the present invention to provide an improved coating composition comprising copolymers of vinylidene chloride that are especially useful for coating base film structures of, for example, polypropylene.

According to the present invention there is provided a composition comprising a copolymer of vinylidene chloride and at least one other ethylenically unsaturated monomer copolymerizable therewith, and a non-ionic surfactant. The composition of the invention preferably comprises a copolymer obtained from between about 65 and about 95 parts by weight of vinylidene chloride between about 5 parts and about 35 parts by weight of at least one other ethylenically unsaturated monomer copolymerizable therewith, and between about 0.1% and about 1% by weight, based upon the total weight of said composition, of a non-ionic surfactant. The copolymer coating composition of the present invention may preferably additionally contain between about 2% and about 7% by weight, based upon the total composition weight, of a wax having a melting point of at least 75° C. and a hardness value of at least 0.25 kg. per square millimeter at 60° C.

Also, according to the present invention there is provided a process for preparing aqueous vinylidene chloride copolymer dispersions which comprises slowly and continuously introducing vinylidene chloride monomer and at least one other ethylenically unsaturated monomer copolymerizable therewith into an aqueous polymerization solution containing a reduction oxidation polymerization initiator and a non-ionic surfactant and having a surface tension of at least 40 dynes per centimeter whereby to react said monomers to obtain a resulting copolymer dispersed in said aqueous reaction medium withohut coagulating. In a preferred embodiment, the polymerization solution contains a wax having a melting point of at least about 75° C. and a hardness value of at least about 0.25 kg. per square millimeter at 60° C.

According to the present invention there is further provided a moisture-resistant and heat-sealable film structure comprising a base film having firmly adhered to at least one surface thereof a coating comprising a copolymer of vinylidene chloride and at least one other ethylenically unsaturated monomer copolymerizable therewith and a non-ionic surfactant. The moisture-resistant and heat-sealable film structure of the present invention preferably comprises a base layer of polypropylene having firmly adhered to at least one surface thereof a coating comprising a copolymer obtained from between about 60 and about 95 parts by weight of vinylidene chloride, between about 5 and 20 parts by weight of ethyl acrylate, between about 5 and 20 parts by weight of methyl methacrylate or acrylonitrile, between about 3 and about 8 parts by weight of acrylic acid or itaconic acid, and between about 0.1 and 1.0% by weight, based upon the total copolymer weight, of a non-ionic surfactant.

The nature and advantages of the composition, process and film structure of the present invention will be more clearly understood from the following description thereof.

The composition of the present invention is comprised of a plurality of components. One essential component thereof is a copolymer obtained from vinylidene chloride and at least one other ethylenically unsaturated monomer copolymerizable therewith. The copolymer of vinylidene chloride preferred for purposes of the invention contains between about 60 and 95 parts by weight of vinylidene chloride, and between about 5 and 40 parts of one or more ethylenically unsaturated monomers copolymerizable therewith. Representative mono-olefinic monomers copolymerizable with vinylidene chloride include, for example, acrylic acid, methyl, ethyl, isobutyl, butyl, octyl and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone; acrylonitrile, methacrylonitrile, methyl vinyl ketone, vinyl chloride; vinyl acetate; vinyl propionate; vinyl chloroacetate; vinyl bromide; styrene; vinyl naphthalene; ethyl vinyl ether; N-vinyl phthalimide; N-vinyl succinimide; N-vinyl carbazole; isopropenyl acetate; acrylamide; methacrylamide and alkyl substitution products thereof; phenyl vinyl ketone; diethyl fumarate; diethyl maleate; methylene diethyl malonate; dichlorovinylidene fluoride; itaconic acid; dimethyl itaconate; diethyl itaconate; dibutyl itaconate; vinyl pyridine; maleic anhydride; allyl glycidyl ether and other unsaturated aliphatic ethers described in U.S. Pat. 2,160,943. The monomers may be generally defined as vinyl or vinylidene having a single $CH_2=C$ grouping. The most useful monomers fall within the general formula

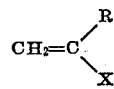

where R may be hydrogen, halogen, or saturated aliphatic radical, and X is a member of the group consisting of —Cl, —Br, —F, —CN, —$C_6H_5$, —COOH,

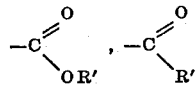

—CH=O, —$OC_6H_5$, —$CONH_2$, —CONH—R' and —$CONR'_2$ in which R' is alkyl.

Another essential component of the composition of the present invention is a non-ionic surfactant. In general, those non-ionic surfactants which lower surface tension of water to not less than about 40 dynes/cm., and preferably to not less than 42.5 dynes/cm., are operable. These include polyoxyalkylene derivatives of various compounds such as those of octylphenol (Triton X–405, X–305, proprietary of the Rohm & Haas Co.), of nonylphenyl, of sorbitan esters such as those of lauric acid, palmitic acid, stearic acid and oleic acid. (Tweens-Atlas Powder Co.). A sufficient amount of the non-ionic surfactant is included in the reaction medium to produce micelles of the polymerizing monomers. The amounts required may vary with different surfactants. In general, there is employed between about 0.1 and about 2.0 parts thereof per part of monomer to be polymerized therein.

A preferred embodiment of the composition of the present invention comprises an aqueous dispersion of a copolymer of 60 to 95 parts by weight of vinylidene chloride, about 3 to 8 parts by weight of a member selected from the group consisting of acrylic acid and itaconic acid, about 5 to 20 parts by weight of ethyl acrylate, about 5 to 20 parts by weight of a member of the group consisting of methyl methacrylate and acrylonitrile and, based on the weight of the copolymer, 0.1 to 1.0 percent of a non-ionic surfactant and 2 to about 7 percent of a wax having a melting point of at least 75° C. and a hardness value of at least 0.25 kg. per square millimeter at 60° C.

The vinylidene chloride content in the copolymeric composition may range from 60 to 95 percent by weight, preferably from 65 to 85 percent. Ethyl acrylate content may range from 5 to about 20 weight percent, with the range of 7 to 15 percent being preferred. Acrylic acid, when a component of the copolymer, may range from 3 to 8 weight percent, and is a preferred component when the coating composition is to be used on polyolefin films such as polypropylene. Acrylic acid may be replaced by itaconic acid for coating of some films such as those of polyalkylene terephthalates or isophthalates and regenerated cellulose.

The wax used in the coating composition of the invention should have a melting point of at least 75° C. and a hardness value of at least 0.25 kg. per square millimeter at 25° C. Among waxes which may be used are the natural waxes such as Carnauba, Ouricuri and Raffia waxes, petroleum waxes such as paraffin and microcrystalline waxes, and synthetic waxes such as the hydrocarbon waxes made by the Fischer-Tropsch synthesis.

The coating dispersions of the invention are of primary interest for coating film structures, i.e., self-supporting film structures, of polyolefins such as polypropylene. However, they also can be used on film structures of polyvinyl fluoride, polyvinyl chloride, polyalkylene terephthalates and isophthalates, polyamides, regenerated cellulose, cellulose derivatives such as cellulose acetate, ethyl cellulose and hydroxyethyl cellulose as well as on paper and paper products. In the case of plastic films, their surfaces may be treated for adherability by flame treatment, electrical discharge, chlorination, treatment with ultraviolet light, chemical treatment and combinations of certain of these treatments, all as is well known in the art.

The vinylidene chloride aqueous copolymer dispersions of this invention are made by copolymerizing the monomers employing a typical Redox initiator system such, for example, as ammonium persulfate/sodium bisulphite. Other well known systems can be used as well. In making the preferred dispersions an aqueous solution of the initiator system and a non-ionic surfactant are placed in the reaction vessel. Then the copolymerizable monomers are slowly fed to the reaction zone. Once the polymerization reaction has begun (which is essentially immediate), the reacting monomers are introduced continuously in a ratio fixed by the composition desired in the final copolymer and at such a rate that a uniform polymerization rate is obtained. Typically, about 0.25 to 4 percent of the total quantity of monomers to be copolymerized is added to the initiator system each minute until the addition has been completed.

The polymerization process is conveniently carried out at atmospheric pressure but superatmospheric pressure can as well be used. While generally elevated temperatures may be used, preferably the refluxing temperature of the vinylidene chloride-monomer mixture, that is around 38–40° C., is employed. The polymerizations may also be carried out at autogenous pressure at elevated temperatures. The essential feature is that the copolymer dispersions must be produced by continuous addition of the monomers to the reaction vessel containing the initiator system, and other parameters of the polymerization can be adapted from the prior art as suits the convenience of the operator.

The initiator system used in the process of the invention, except for the inclusion of the non-ionic surfactant, can be any of those now known to the art. A suitable system is composed of ammonium persulfate, sodium metabisulfite and ferrous ammonium sulfate. These materials are used as a 0.1 to 2 percent aqueous solution. Other components which could be employed include potassium persulfate, sodium periodate or hydrogen peroxide with reducing agents such as ferrous and cuprous compounds, sulfur compounds, various reducing sugars or levulinic acid.

An additional important discovery hereof is that upon including a wax in the polymerization system, as hereinabove defined, vinylidene chloride copolymer dispersion produced therein has better blocking characteristics than they otherwise would. Among the waxes which may be used are the natural waxes such as Carnauba, Ouricuri, and Raffia waxes; petroleum waxes such as paraffin and microcrystalline waxes and synthetic waxes such as the hydrocarbon waxes made by the Fischer-Tropsch synthesis. Any other wax having a melting point of at least 75° C. and a hardness value of at least 0.25 kg. per square millimeter at 25° C. can also be used.

The preferred aqueous vinylidene chloride copolymer dispersion of this invention is one containing the wax ingredient incorporated therein by carrying out the copolymerization in the wax-containing dispersion. Films coated from such compositions show not only excellent resistance to moisture and good wet-adhesion, as exemplified by anchorage values and "no-peel" adhesion when subjected to immersion in water, as well as good blocking characteristics. Still better blocking performance is realized in the use of the four component vinylidene chloride copolymers derived from the comonomers including ethyl acrylate as well as acrylic acid.

According to the present invention there is further provided a moisture-resistant and heat-sealable film structure comprising a base film such as, for example, polypropylene, regenerated cellulose, etc., having firmly adhered to at least one surface thereof a coating comprising the composition described hereinabove. The base film is coated with the above described composition by any convenient coating technique. Base films of regenerated cellulose may be prepared in accordance with the method described in U.S. Pat. Nos. 1,548,864 and 1,601,289 utilizing viscose casting techniques as described in any of U.S. Pat. Nos. 2,862,245; 3,073,733; 2,962,766; 3,050,775 and 2,254,203. The gel regenerated cellulose film so produced may be dried by passing the film over and in contact with a series of heated rolls in a heated chamber, as described in any of U.S. Pat. Nos. 2,000,079; 2,141,277; 2,746,166 and 2,746,167. The dried regenerated cellulose films so prepared contain usually about 5% to about 30% by weight, based upon the total weight of the cellulosic film, of a propylene glycol, and optionally between about 1% and about 10% by weight, based upon the total weight of the cellulosic film, of glycerol.

The principle and practice of the present invention will now be illustrated by the following examples which are provided to show the practice and use thereof, but it is not intended that the invention be limited thereto since modifications in technique and operation will be apparent to anyone skilled in the art. All parts and percentages in the following examples are by weight unless otherwise indicated.

The test samples of coated base film prepared in the following examples were evaluated in accordance with the following testing procedures:

Heat-seal strength is measured by cutting a piece of coated film, 4 x 10 in., into two pieces, 4 x 5 in. each, with the long direction being in the direction of polymer extrusion (the machine direction). The two pieces are then superimposed so that the coated surfaces are in contact. The two pieces of superimposed film are then sealed together at each end at right angles to the machine direction axis. For these tests, the films are sealed using a pressure of 10 p.s.i. for a 0.25 second dwell time and at the specified temperature. The sealed sheets are then cut in half at right angles to the machine direction axis. From the center of the resulting pieces, one inch wide strips parallel to the machine axis are cut. These are conditioned at 75° F. for one day, and 35% and 81% relative humidity, respectively, and then tested by placing the free ends of the strips in a Suter Tester Machine and pulling them apart. The highest force in grams required to pull the strips apart is taken as a measure of the heat-seal bond strength.

Peel strength is measured by attempting to lift the coating from the base film with a sharp-edged instrument such as a knife. If the coating cannot be lifted without rupture of the coating itself, the bond is labelled "No Peel" (NP). If the coating can be lifted, a one inch wide strip of adhesive tape is attached to the loosened strip which is then pulled off at an angle of 180°. The bond so obtained can be labelled "can peel" or the actual force required to pull off the strip of coating can be recorded. For these experiments, prior to testing the coated film samples are immersed in water at 45° C. for 16 hours.

Blocking is measured by stacking 15 to 20 sheets of 4 x 4 in. test film samples front to back. The stack of test samples is placed between two 4 x 4 in. sheets of chipboard and wrapped to form a package in waxed kraft paper. The package is placed on a smooth sheet of metal at least 1/16 in. thick and approximately 6 in. square. A 4 x 4 in. lead weight with a smooth face and having a weight of 25 lbs. (1.5 lb./sq. in.) is accurately placed on the package of sheets, and the entire assembly is placed in an oven maintained at 52° C. for 16 hours. The package of sheets is removed from the oven and allowed to cool to room temperature (one hour or more). The cooled package of sheets is carefully unwrapped, the chipboard removed, and the stack of sheets grasped by thumb and forefinger in the center of the stack. A shearing force is then applied with care taken to avoid bending the stack or disturbing its edges.

The stack is graded as follows:

Grade 1—the sheets slide apart individually with no tendency whatever to cling together.
Grade 2—the stack separates into 2 or more groups of sheets which remain moderately firmly matted together.
Grade 3—the stack cannot be separated by straight shearing force and can be separated only by peeling the sheets apart.
Grade 4—the sheets are stuck tightly together and cannot be separated without damage to the coating in peeling the sheets apart.

Coated films having Grade 1 blocking are preferred. Coated films having Grade 2 blocking can be used. For some applications, coated films with Grade 3 blocking can be used, but coated films with Grade 4 blocking are unsatisfactory for most purposes.

EXAMPLE 1

600 parts of water, 228 parts of vinylidene chloride ($VCl_2$), 57 parts of methylacrylate (MA), and 15 parts of acrylic acid (AA) are polymerized in an aqueous initiator-surfactant system, consisting of 0.40% of Triton X–405 (70% aqueous solution of octylphenol/ethylene oxide polymer product of the Rohm & Haas Co.), 0.10% of ammonium persulfate, 0.10% of sodium meta-bisulfite and 0.0007% of ferrous ammonium sulfate. The initiator system is formed as follows: The water and surfactant are stirred under nitrogen in a reaction flask at 35° C., and then the initiators are added. Thereafter the monomer mixture, in the weight ratio indicated above, is added continuously over a period of 75 minutes. Reaction begins almost immediately. A steady refluxing of the reaction mixture is maintained through the cycle as the temperature of the mixture holds at approximately 38–39° C. The resulting aqueous dispersion contains approximately 40% solids, has a particle size of 0.04–0.2 microns, and an inherent viscosity in the range of 0.3–0.6 when measured in tetrahydrofuran at 0.5% concentration at 30° C. The resulting dispersion can be heated to temperatures of 90° C. with no evidence of coagulation. Attempts to carry out the preparation of the composition described above, but wherein the monomers are added batchwise leads in each case to a coagulated dispersion.

The resulting vinylidene chloride copolymer dispersion is coated on both surfaces of a film, of biaxially oriented and flame treated polypropylene, at a coating thickness of 6.9 grams per square meter. The coated film shows a no-peel adhesion value when subjected to 16 hours in water at 45° C.; that is, the coating cannot be stripped from the base layer without severely damaging the coating layer. On heat sealing the test film to itself and thereafter conditioning he sealed area at 81% RH and 75° F. for 16 hours, bond strengths in the range of 200 to 300 grams per inch are obtained. For comparison, a polypropylene film treated for adherability as described above and coated with a vinylidene chloride copolymer dispersion of the same composition as the test dispersion, except that an ionic surfactant (sodium lauryl sulfate) is used instead of the non-ionic surfactant of the test dispersion, shows a zero peel value after 16 hours immersion in water at 45° C. and a heat seal value of 50 grams per inch after 16 hours at 81% RH and 75° F.

EXAMPLE 2

In this example the dispersion is prepared at atmospheric pressure at reflux temperature in an initiator system containing a natural occurring wax (carnauba) having a M.P. of 86° C., and a Hardness of 0.47 kg./mm.$^2$ (ASTM-D 1474-62T, Method B).

Following substantially the same procedure as described above, but wherein there is incorporated sufficient carnauba wax in the surfactant/water mixture to give a 3% wax dispersion, based on the total weight of the mixture, a vinylidene chloride copolymer dispersion is obtained which when coated on a similarly flame-treated polypropylene film provides superior anchorage and no-peel adhesion after 16 hours in water at 45° C., whereas a control coating shows sloughing. Heat seal strength at 110° C. of 200 to 300 g./inch are obtained after aging coated films for seven days at 81% RH. A blocking grade of 3 is obtained at this level of wax (Grade 4 would be expected absent the wax). A control film coated with a vinylidene chloride copolymer dispersion prepared as described above but using sodium lauryl sulfate as surfactant instead of Triton X-405 shows heat seal values of less than 50 g./inch after 16 hours at 81% RH.

Results similar to those described above are obtained with a vinylidene chloride dispersion in which the Triton X-405 surfactant is replaced by Triton X-305 (similar to Triton X-405 except that it contains about 30 ethylene oxide units rather than 40) and by Tween 60 (Sorbitan monooleate—Atlas Chemical Industries, Inc.).

The test films perform well when used as a wrap for candy, a product of relatively high moisture content. The coating remains firmly adhered to the base in contrast to experience with the control film which under the same exposure shows loosening of the coating from the base.

EXAMPLE 3

The vinylidene chloride copolymer compositions listed herebelow are made by first placing in a reaction vessel 580 parts of water and 60 parts of a wax dispersion consisting of 1.8 parts of Triton X-405 (octylphenol/ethylene oxide polymer—Rohm and Haas Co.) and 12 parts of carnauba wax. The initiator system consisting of 0.8 part of ammonium persulfate, 0.8 part of sodium metabisulfite and 0.003 part of ferrous ammonium sulfate is then added under nitrogen, the whole being flushed into the reactor with 100 parts of water.

The individual monomers are next introduced into the reactor in the ratios indicated. The polymerization begins almost immediately. A steady refluxing of the reaction mixture is maintained through the cycle at a temperature in the range of 38–40° C. for the time indicated.

SAMPLE A

Vinylidene chloride/ethyl acrylate/methyl methacrylate/acrylic acid copolymer of 70/15/10/5% by weight, based upon copolymer weight

| | Parts |
|---|---|
| VCl$_2$ | 280 |
| EA | 60 |
| MMA | 40 |
| AA | 20 |

Time, 65 minutes.

SAMPLE B

70/10/15/5% by weight, based upon copolymer weight

| | Parts |
|---|---|
| VCl$_2$ | 280 |
| EA | 40 |
| MMA | 60 |
| AA | 20 |

Time, 68 minutes.

SAMPLE C

Vinylidene chloride/ethyl acrylate/acrylonitrile/acrylic acid copolymer of 75/13/7/5% by weight, based upon copolymer weight

| | Parts |
|---|---|
| VCl$_2$ | 300 |
| EA | 52 |
| AN | 28 |
| AA | 20 |

Time, 80 minutes.

SAMPLE D

80/8/12/5% by weight, based upon copolymer weight

| | Parts |
|---|---|
| VCl$_2$ | 320 |
| EA | 32 |
| AN | 48 |
| AA | 20 |

Time, 65 minutes.

SAMPLE E

Vinylidene chloride/methyl acrylate/acrylic acid control copolymer of 75/20/5% by weight, based upon copolymer weight

| | Parts |
|---|---|
| VCl$_2$ | 300 |
| MA | 80 |
| AA | 20 |

Time, 60 minutes.

The vinylidene chloride copolymer dispersions are coated on both surfaces of biaxially oriented, flame treated polypropylene films at a coating thickness of about 6 grams per square meter. Properties of the resulting films are shown in tabular form below:

TABLE 1

| | Coating composition | | | Heat seal strength, gms. | | | | |
|---|---|---|---|---|---|---|---|---|
| | | | | | 35% RH | | | |
| Sample | Vinylidene chloride copolymer composition | Weight percent [1] | Blocking grade | 110° C. | 110° C. | 130° C. | 81% RH, 130° C. | Peel strength |
| A | VCl$_2$/EA/MMA/AA | 70/15/10/5 | 2 | 280 | 350 | 350 | 330 | NP[2] |
| B | VCl$_2$/EA/MMA/AA | 70/10/15/5 | 1+ | 280 | 385 | 360 | 310 | NP |
| C | VCl$_2$/EA/AN/AA | 75/13/7/5 | 1+ | 155 | 260 | 230 | 350 | NP |
| D | VCl$_2$/EA/AN/AA | 80/8/12/5 | 2 | 175 | 240 | 290 | 300 | NP |
| E | VCl$_2$/MA/AA | 75/20/5 | 3 | 295 | 305 | 285 | 260 | NP |

[1] By weight based upon the copolymer weight derived from the indicated monomers.
[2] No peel, that is, the coating cannot be peeled from the base layer.

Note.—Monomer abbreviations: VCl$_2$=Vinylidene Chloride; AN=Acrylonitrile; MMA=Methyl Methacrylate; AA=Acrylic Acid; MA=Methyl Acrylate; EA=Ethyl Acrylate.

Films coated with the four component polymers show better blocking performance than those coated with the three component polymer (E).

Films coated with the composition of this invention are useful for packaging a variety of products, particularly products of high moisture content, such as foodstuffs, candy, bakery goods, tobacco and the like. Such films can be laminated to metal foils and other films such as polymer coated cellophane and coated thermoplastic films. Such structures can be made by thermal lamination or by use of appropriate adhesives, such as the dextrine, natural and synthetic rubber latices and heat activated waxes and wax combinations with resins such as ethylene/vinyl acetate.

We claim:
1. A process for preparing a composition comprising an aqueous dispersion of a copolymer of four monomers consisting of 60 to 95 parts by weight of vinylidene chloride, about 5 to 20 parts by weight of ethyl acrylate, about 5 to 20 parts by weight of a member of the group consisting of methyl methacrylate and acrylonitrile, about 3 to 8 parts by weight of an unsaturated organic acid of the group consisting of acrylic acid and itaconic acid, and 0.1 to 1.0% by weight, based on the weight of said composition, of a non-ionic surfactant consisting of polyoxyalkylene derivatives of octylphenol, nonylphenyl and sorbitan esters, and 2% to about 7% by weight, based upon the total composition weight, of a wax, which process comprises:

slowly and continuously introducing the four monomers into an aqueous polymerization solution containing a reduction oxidation polymerization initiator and the non-ionic surfactant and having a surface tension of at least 40 dynes per centimeter whereby to react said monomers to obtain a resulting copolymer dispersed in said aqueous reaction medium without coagulating and wherein the polymerization solution contains the wax predispersed therewithin having a melting point of at least about 75° C. and a hardness value of at least about 0.25 kg. per square millimeter at 60° C.

2. The process of claim 1 wherein the acrylic acid content is about 5%.

References Cited
UNITED STATES PATENTS

| | | | |
|---|---|---|---|
| 2,538,737 | 1/1951 | Stanton et al. | 260—29.6 T |
| 2,570,478 | 10/1951 | Pitzl | 260—29.6 TA |
| 3,291,769 | 12/1966 | Woodford et al. | 260—29.6 ME |
| 3,300,423 | 1/1967 | Brown et al. | 260—29.6 EME |
| 3,309,330 | 3/1967 | Settlage | 260—29.6 TA |
| 3,361,695 | 1/1968 | Wilhelm et al. | 260—29.6 E |
| 3,404,114 | 10/1968 | Snyder et al. | 260—29.6 E |
| 3,442,836 | 5/1969 | Barry | 260—30.4 |
| 3,540,921 | 11/1970 | Ward et al. | 117—122 |
| 3,309,330 | 3/1967 | Settlage | 260—29.6 TA |
| 3,442,836 | 5/1969 | Barry | 260—30.4 R |
| 3,361,695 | 1/1968 | Wilhelm et al. | 260—29.6 E |
| 3,404,114 | 10/1968 | Snider et al. | 260—29.6 E |

MORRIS LIEBMAN, Primary Examiner

S. L. FOX, Assistant Examiner

U.S. Cl. X.R.

117—144; 260—29.6 T